United States Patent
Brown

[11] 3,789,634
[45] Feb. 5, 1974

[54] SECURITY STEER-GEAR CYCLELOCK

[76] Inventor: Roland Clough Brown, 425 Stratford Ct., Del Mar, Calif. 92014

[22] Filed: Oct. 20, 1972

[21] Appl. No.: 299,403

[52] U.S. Cl............................. 70/186, 70/233, 70/236
[51] Int. Cl.............................. B62h 5/06, B62h 5/10
[58] Field of Search...... 70/181, 186, 213, 233, 236

[56] References Cited
UNITED STATES PATENTS

| | | | |
|---|---|---|---|
| 686,940 | 11/1901 | Huscher | 70/236 |
| 1,330,394 | 2/1920 | Riggins | 70/185 |
| 1,397,450 | 11/1921 | Penny | 292/305 |
| 1,954,739 | 4/1934 | Lyons | 292/305 |
| 2,222,900 | 11/1940 | Fruns | 70/186 |
| 2,637,789 | 5/1953 | Critchfield et al. | 200/44 |

*Primary Examiner*—Albert G. Craig, Jr.

[57] ABSTRACT

A combination lock is placed on the side of the fork or crank assemblies of a bicycle and inserted far enough to insure that the lock remains locked even when the exposed portion of the lock is sawed off. The sliding lock bolts and pin extend through the fork or crank assemblies and end in a fingergrasp cap to permit the operator to unlock the mechanism when the correct combination is set on the lock dials. The pin has at its inner end a crosshead holding a bolt stud that fits into a hole in the crankshaft or into a hole in the stem of the fork when the bicycle is locked. When the combination lock is unlocked, the stud bolt is pulled back out of connection with the hole in the crank or fork, pinned in this position by the operator during use, and returned to the locked position when not in use, as desired. A spring holds the pin in the locked position at all times unless the combination lock is dialed to open it. If the fingergrasp cap end is sawed off the spring inside the crankcase or fork section continues to hold the pin and bolt stud in the locked position. If the lock end is sawed off the fixed, inserted portion of the lock inside the crankcase or fork assembly continues to hold the sliding bolts in the locked position.

10 Claims, 6 Drawing Figures

3,789,634

SECURITY STEER-GEAR CYCLELOCK

The instant invention relates to a new, useful and unique combination of a bicycle and a combination lock as an improvement over either one. In the combination, the lock is always instantly available for use to secure the vehicle against theft. No groping search is necessary to find the key for the combination lock as no keys are required.

It is the primary object of the present invention to provide an instant lock for the bicycle in the fork assembly or in the crank assembly or both to secure the vehicle against ride-away theft, to provide peace of mind to the owner when the bicycle is parked as safe, and to increase immeasurably the difficulty of use of the vehicle even if carried off from the scene.

In conjunction with the above primary object, it is also a significant object of the instant invention to provide an improvement on a lock that may be fitted to a bicycle, without interfering with its operation unless locked.

Also, a general objective permits utilization of the invention on men's or women's Deluxe multiple-speed, lightweight racing type, exercise bicycles as well as the heavier types, even children's three-wheelers or adults' motorcycles as long as they have a fork or crank assembly or both.

Likewise, a significant object of the instant invention is to utilize a three dial or more type combination lock, giving a one-tenth of a percent chance or less of a lucky opening of the combination lock by a potential thief.

A further object of the invention is to provide, in locking the fork assembly, a bicycle that cannot be steered when ridden as the front wheel would be locked against any balancing action.

Another object of the invention is to provide, in locking the crank assembly, a bicycle that cannot be ridden as the crankshaft would be locked against any cranking action.

Again, the instant invention protects the vehicle from use when locked by immobilizing either or both of the steering and cranking mechanisms in such a way that it is so difficult and time-consuming, to disassemble by sawing off the combination end of the lock and the fingergrasp cap end of the pin, that a potential thief would be dissuaded before trying and perhaps turn to another bicycle not so secure.

Basically, the instant invention presupposes the fact that the owner of an expensive bicycle wishes to provide his vehicle with protection against theft with a lock that cannot be opened even when its exposed ends are sawed off. The combination lock is partially embedded in the frame at the fork or crank assemblies or both at the time of manufacture, or later with some shop work. This feature makes dismantling of these assemblies to unlock the fork tube or the crankshaft or both, following unsuccessful attempts to unlock by sawing off the exposed parts of the lock, too time-consuming for rapid theft.

Likewise, the instant invention frees one from the frustrations of a misplaced or lost key, and saves the time spent in searching for it, since a combination lock is utilized and the bicycle is always ready to serve the owner who knows the right combination to unlock the steering and crank mechanisms.

These, together with other objects and advantages which will become subsequently apparent, reside in the details of assembly and operation as more fully hereinafter described and claimed, reference being made to the accompanying drawing forming a part hereof, wherein like characters refer to like parts throughout, and in which:

Figure 1:
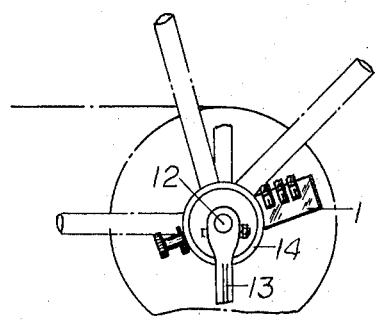
FIG. 1 is a phantom side view of the crank section of a bicycle showing the Cyclelock in full in position.
Figure 2:
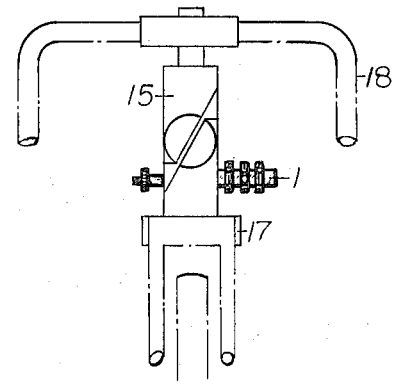
FIG. 2 is a phantom front end view of the fork section of a bicycle showing the Cyclelock in full in position.
Figures 3, 5, 6:
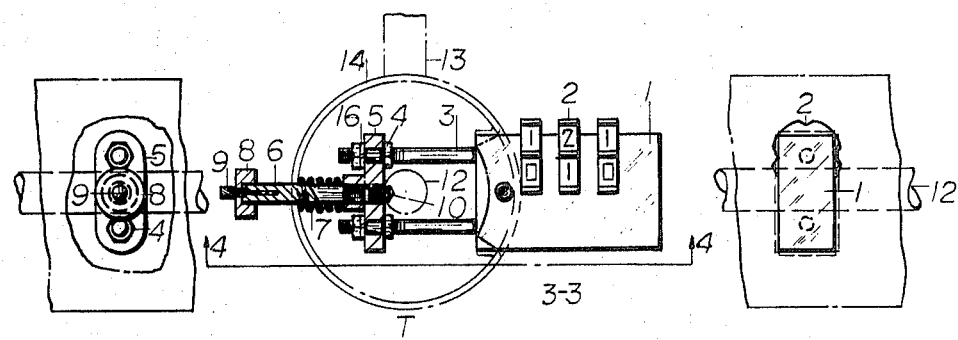
FIG. 3 is an enlarged top view T of the Cyclelock taken along planes cutting section line 3—3 in FIG. 4.
FIG. 5 is an enlarged left end view of FIG. 3 through the broken-open phantom crank housing.
FIG. 6 is an enlarged right end view of FIG. 3 through the broken-open phantom crank housing.
Figure 4:
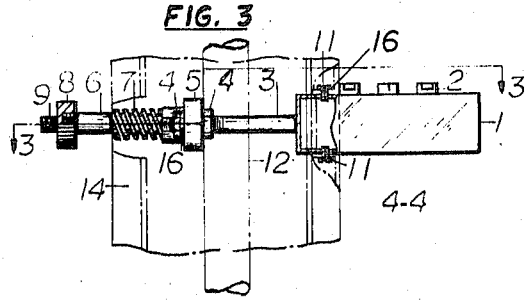
FIG. 4 is an enlarged broken open side view taken along section line 4—4 in FIG. 3 to produce what is essentially a side view of the Cyclelock.

Referring now specifically to the drawing in FIGS. 1 through 6, the Security Steer-Gear Combination Cyclelock 1 with combination dials 2 and slide bolts 3, straddling the crankshaft of fork stem with nuts 4, embracing the crosshead 5, which is extended by the pin 6 screwed tightly thereto, surrounded by the spring 7, and capped on the fingergrasp cap 8 on the outer end with a hole in the center extending into the pin for the lockpin 9 with knurled head and threaded portion just below the head to secure it. Inside the crosshead is screwed the lockstud 10 which is adjustable by the threads to adjust the projecting length to the stroke of the lock for a snug fit into the hole in the crankshaft. Screws 11 will retain the lock in the frame. In phantom the axle 12, crank 13, crank housing 14, fork housing 15, fork 17 and handle bars 18 are shown for completeness. Lock washers 16 are recommended to prevent the loosening of the nuts and screws.

To assemble the Cyclelock to the bicycle drilled for the pin in the crankshaft or fork housing and the notch with ears punched for screws for the combination lock, place the lock into the notch with the two sliding bolts straddling the crankshaft or fork stem as the case may be. Screw one nut on each sliding bolt all the way to the end of the threaded portion. Insert and tighten the screws with lock washers through the ear holes into the combination lock body tapped holes already in the lock as furnished. Next insert the pin, with surrounding spring and crosshead tightly screwed on the inner end, and lockstud screwed into the crosshead projecting an amount equal to the stroke of the lock, from the inside of the housing through the hole already drilled for the outer end, and by compressing the spring, slip the crosshead end onto the two sliding bolts and tighten the nuts over lock washers. The lockstud may be adjusted for length to fit into the hole in the crankshaft or fork stem concerned snugly when the lock is locked and to stand clear of these holes when unlocked. The fingergrasp cap is then screwed onto the projecting end of the pin on the outside of the crankshaft or fork housing. Finally, the lockpin is inserted in the hole in the center of the fingergrasp cap and the pin and screwed tightly to secure it by turning the knurled head to complete the assembly. To dismantle the Cyclelock, reverse the above operations.

To operate the Cyclelock, first set the combination on the lock as desired, then set the combination to open the lock, now pull out on the fingergrasp cap on the opposite side of the frame housing until the small lockpin hole, drilled and tapped part way vertically through the pin, appears outside of the frame housing. Remove the lockpin from the park position along the centerline of the fingergrasp cap and pin. Insert and screw the lockpin tightly into the exposed lockpin hole to hold the pin in the out or unlocked position against the spring action during use of the vehicle. Proceed to ride the bicycle.

To lock the Cyclelock, simply remove the lockpin from the lockpin hole by unscrewing it and pulling it out by first pulling out on the fingergrasp cap to reduce friction between the frame housing and the lockpin. When the lockpin is out let go on the fingergrasp cap. It will move inward actuated by the spring and force the lockstud into the hole in the crankshaft or fork stem if they are in proper position. If not, then rotate the handlebars to the straight ahead position or the cranks to the vertical position until the lockstud slips into place. Note that the lockpin hole now has disappeared into the frame housing. Turn the combination. Replace the lockpin in the centerline hole park position. The bicycle is now locked and may be left anywhere securely.

Now let us consider the problem facing one who considered stealing a parked bicycle equipped with Cyclelocks. First, can the riddles of the combination locks be solved quickly enough to release the locks and make a get away? Since the smallest size Cyclelock considered for use is the three dial type, it means that there are ten cubed or one thousand combinations to try. To turn just one combination and try the lock takes about 12 seconds and $1,000 \times 12/60 = 200$ minutes and with a probability of one half or luck it would take 1 hour and 40 minutes for the round of combinations which will result in the opening of one lock, say the steering. If so equipped now he must turn to the crankshaft lock and since it is less handy to work conveniently, it will take a little longer to run through the 1,000 combinations there, in all 3 hours and 20 minutes. On a probability basis, thus with luck, the whole job can be done in, say about 3 hours. Second, it would seem easier and less dangerous to carry off the bicycle in a car or truck, then work on the vehicle in private, out of the public eye. The job then is to, perhaps, saw off the lock ends and the pin ends and thus release the two locks. If this mistake is made, the thief will find that the locks still hold as the spring retains the lockstud in the hole in the shaft or fork stem, and the portion of the locks inside the crankcase or fork assembly contains the locking portion of the locks and holds the slide bolts in place as before in their locked positions. The remnant of the lock after sawing is held firmly in place by the screw fastenings to the ears on the inside of the crank and fork housing. Third, now the thief finds that he needs to disassemble the entire mechanism of the crankcase and the steering post to get at the inner lock parts and release the studbolt from its locked position. Again, much time is spent on this operation. It would be much easier to tackle a bicycle not fitted with Cyclelocks. The reason that the lock will not open when the exposed ends are sawed off is because the spring holds the pin and studbolt snugly in position in the crank or fork stem hole by its reaction against the inside of the housing, and with the remnant end of the lock made fast to the frame housing by the screws which cannot be reached by the saw, the slide bolts cannot be pushed into the housing from the outside since the remnant lock portion is rigidly fixed to the ears of the housing. So, all in all, it will prove quite futile to steal a bicycle equipped with Cyclelocks that is parked for less than 3 hours. Since it may be carried away if parked for longer periods without surveillance, like overnight, it would be best, in addition to Cyclelocks, to chain the vehicle to a fixed object, like a tree in the country or a pole in the city.

Generally the Cyclelock is made of steel and the exposed lock, pin and fingergrasp cap and lockpin chrome, silver or gold-plated or enameled to match the color scheme of the vehicle to which assembled.

Some of the many advantages of the Cyclelock in a bicycle combination enable the user to lock and unlock his vehicle without a key, avoiding a search for same or its loss, wasting time and costing money, enjoyment of the confidence that his vehicle will be secure, changing the combination of the locks as desired and, if two Cyclelocks are installed, having different combinations for each lock, and knowledge that the steering and the driving mechanisms are both securely locked and that, if the vehicle is carried away, it cannot be operated without either sawing off the lock and pin ends and then disassembling the crank and fork mechanisms completely, which is thought to be work sufficient to dissuade the occasional thief.

From the foregoing it will be appreciated that a unique combination of a bicycle and a combination lock has been devised by means of the lock body being partially embedded in the frame of the bicycle with its slide bolts, and with a pin with crosshead and studbolt that fits into a hole in the crank or steering fork stem to lock or unlock the bicycle driving or steering mechanisms or both, depending on whether the fingergrasp cap is placed in the "in " or locked position or the "out " or unlocked position and with the lockpin in position to hold the pin out. Incidentally, while not detailed above, a Cyclelock of proper size can be fitted to speed racers, hi-risers, tricycles, monocycles and motorcycles.

The foregoing is considered as illustrative only of the principles of the invention. Further, since numerous modifications and changes will readily occur to those skilled in the art, it is not desired to limit the invention to the exact fabrication and operation shown and described, and accordingly all suitable modifications and equivalents may be resorted to as, for example, key or other type locks, other positions of the lock mechanism on the vehicle, various push-pull fingergrasp cap designs, various lock fastenings to the frame like riveting, welding, etc., all falling within the scope of the invention as claimed.

What is claimed as new and useful is as follows:

1. In combination: a housing; a shaft at least partially located within said housing and shiftable with respect thereto, a portion of said shaft located within said housing having a radial hole therein; means supporting said shaft so that its axis is substantially fixed with respect to said housing; a lock casing fixed with respect to said housing; a unit including a pair of generally parallel bolts slidably supported by said lock casing and extending into said housing, one on each side of said shaft, a crosshead positioned within said housing and extending between the distal ends of said bolts and located adjacent the side of said shaft opposite the lock casing, a lockstud extending generally parallel to said bolts and being secured to said crosshead, the distal end of said lockstud being shiftable into and out of said hole in said shaft, and an operating pin secured to said crosshead and extending outwardly of said housing to function as an operating handle; means associated with said operating pin and said housing and adapted to block movement of said unit so as to prevent said lockstud from entering said radial hole and capable of being relieved of its blocking function so that said unit may be shifted to cause said lockstud to enter said radial hole thus locking said shaft against movement with respect to said housing; and locking means associated with said locking casing and at least one of said bolts to selectively lock and release said unit with respect to said lock casing, the locking condition being effectible when said lockstud is extended into said radial hole.

2. The combination of claim 1 wherein biasing means is interposed between said housing and said unit, biasing said unit toward the position wherein the lockstud extends into said radial hole.

3. The combination of claim 2 wherein said biasing means is a coil spring surrounding said operating pin and abutting at one end said housing and at its other end said crosshead.

4. The combination of claim 2 wherein said means to block movement of said unit includes a lockpin removably extending into a radial opening in said operating pin and abutting the exterior of said housing.

5. The combination of claim 1 wherein said means to block movement of said unit includes a lockpin removably extending into a radial opening in said operating pin and abutting the exterior of said housing.

6. The combination of claim 1 wherein said housing is the crank housing of a bicycle and said shaft is the crankshaft.

7. The combination of claim 1 wherein said housing is the fork housing of a bicycle and said shaft is the fork stem.

8. The combination of claim 1 wherein the locking means is of the combination type.

9. The combination of claim 1 wherein the fingergrasp cap is fixed to the distal end of said operating pin.

10. The combination of claim 9 wherein said means to block movement of said unit includes a lockpin removably extending into a radial opening in said operating pin and abutting the exterior of said housing, said fingergrasp cap having an opening therein for storing said lockpin when not in use.

* * * * *